United States Patent
Takenaka et al.

(10) Patent No.: US 8,456,550 B2
(45) Date of Patent: Jun. 4, 2013

(54) IMAGE CAPTURING SYSTEM FOR CORRECTING SIGNALS OUTPUT FROM DEFECTIVE PIXELS

(75) Inventors: Shintaro Takenaka, Yokohama (JP); Kazuhiro Sonoda, Yokohama (JP); Kazunari Kitani, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 13/275,596

(22) Filed: Oct. 18, 2011

(65) Prior Publication Data

US 2012/0033111 A1 Feb. 9, 2012

Related U.S. Application Data

(63) Continuation of application No. 12/104,991, filed on Apr. 17, 2008, now Pat. No. 8,072,513.

(30) Foreign Application Priority Data

May 2, 2007 (JP) .................................. 2007-121835
Feb. 20, 2008 (JP) .................................. 2008-039094

(51) Int. Cl.
*H04N 9/64* (2006.01)

(52) U.S. Cl.
USPC ......... 348/246; 348/301; 348/308; 250/208.1

(58) Field of Classification Search
None
See application file for complete search history.

(56) References Cited

U.S. PATENT DOCUMENTS

| | | | |
|---|---|---|---|
| 5,659,355 A | 8/1997 | Barron et al. | |
| 6,160,281 A | 12/2000 | Guidash | |
| 6,423,994 B1 | 7/2002 | Guidash | |
| 6,657,665 B1 | 12/2003 | Guidash | |
| 6,700,609 B1 | 3/2004 | Abe | |
| 6,750,912 B1 | 6/2004 | Tennant et al. | |
| 6,768,513 B1 | 7/2004 | Watanabe et al. | |
| 6,970,193 B1 | 11/2005 | Kidono et al. | |
| 2005/0248665 A1 | 11/2005 | Morishita | |

(Continued)

FOREIGN PATENT DOCUMENTS

| | | |
|---|---|---|
| EP | 1 617 479 A2 | 1/2006 |
| JP | 63-169882 A | 7/1988 |

(Continued)

OTHER PUBLICATIONS

Aug. 23, 2011 European Search Report in European Patent Appln. No. 08155019.6.

*Primary Examiner* — Nelson D. Hernández Hernández
*Assistant Examiner* — Dennis Hogue
(74) *Attorney, Agent, or Firm* — Fitzpatrick, Cella, Harper & Scinto

(57) ABSTRACT

An image capturing system includes a signal correction unit which corrects a signal output from a defective pixel in an optical black region based on a signal output from a normal pixel. The optical black region has a plurality of pixel blocks. Each of the plurality of pixel blocks has a plurality of pixels each including one or more elements which have the same functions as in the remaining pixels and which have relative positions different from the remaining pixels. The signal correction unit corrects the signal output from the defective pixel in the optical black region based on a signal output from a normal pixel which is included in another pixel block different from the pixel block of the defective pixel in the optical black region and includes one or more elements having the same functions and same relative positions as in the defective pixel.

2 Claims, 17 Drawing Sheets

U.S. PATENT DOCUMENTS

| | | |
|---|---|---|
| 2006/0007331 A1* | 1/2006 | Izumi et al. .................. 348/246 |
| 2006/0011952 A1* | 1/2006 | Ohkawa ........................ 257/291 |
| 2007/0002134 A1 | 1/2007 | Ishihara et al. |
| 2007/0090274 A1 | 4/2007 | Lee et al. |
| 2007/0126886 A1* | 6/2007 | Sakurai et al. ............. 348/222.1 |

FOREIGN PATENT DOCUMENTS

| | | |
|---|---|---|
| JP | 06-178212 A | 6/1994 |
| JP | 08-214220 A | 8/1996 |
| JP | 08-317292 A | 11/1996 |
| JP | 10-256521 A | 9/1998 |
| JP | 2000-156822 A | 6/2000 |
| JP | 2001-045382 A | 2/2001 |
| JP | 2001-145026 A | 5/2001 |
| JP | 2001-218081 A | 8/2001 |
| JP | 2001-268448 A | 9/2001 |
| JP | 2004-350104 A | 12/2004 |
| JP | 2004350104 A * | 12/2004 |
| JP | 2005-176061 A | 6/2005 |
| JP | 2005-323041 A | 11/2005 |

* cited by examiner

F I G. 4
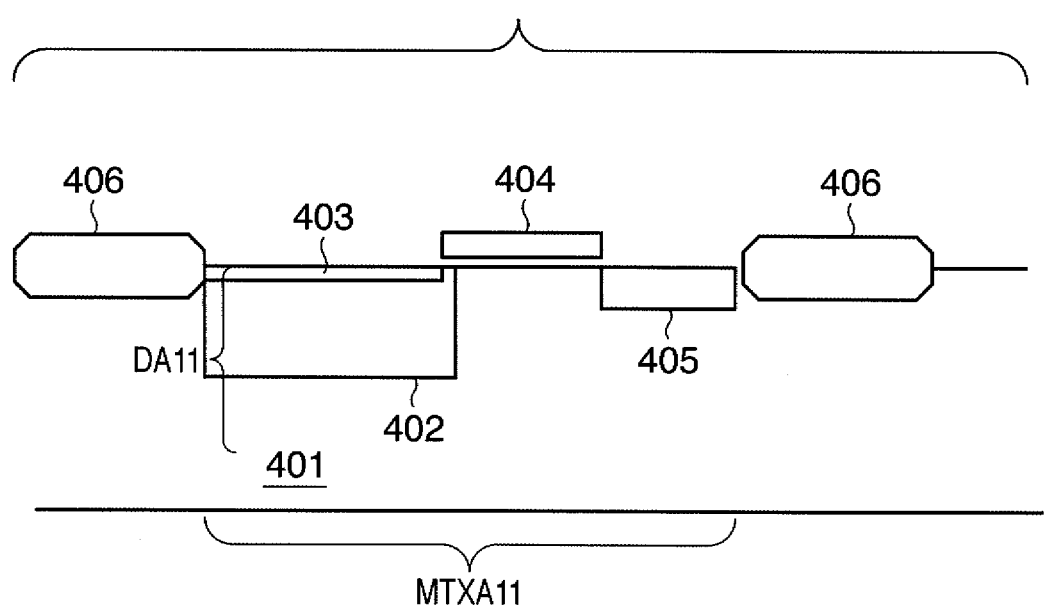

FIG. 14

| | | 1 | | |
|---|---|---|---|---|
| | A11 | A12 | A13 | A14 |
| | B11 | B12 | B13 | B14 |
| EA | C11 | C12 | C13 | C14 |
| | D11 | D12 | D13 | D14 |
| | AN11 | AN12 | AN13 | AN14 |
| | BN11 | BN12 | BN13 | BN14 |
| NEA | CN11 | CN12 | CN13 | CN14 |
| | DN11 | DN12 | DN13 | DN14 |

IMAGE CAPTURING SYSTEM FOR CORRECTING SIGNALS OUTPUT FROM DEFECTIVE PIXELS

This application is a continuation of application Ser. No. 12/104,991 filed Apr. 17, 2008.

BACKGROUND OF THE INVENTION

1. Field of the Invention

The present invention relates to an image capturing system, signal processing circuit, and signal processing method.

2. Description of the Related Art

Many image capturing systems such as a digital camera, video camera, copying machine, or a facsimile apparatus incorporate an image sensing apparatus in which pixels each including a photoelectric conversion element are arrayed one- or two-dimensionally. The image sensing apparatuses include a CCD image sensing apparatus or an amplifying image sensing apparatus having amplifying elements in the pixel region.

Recent image sensing apparatuses tend to increase the number of pixels. As the area of one pixel decreases, the area of a photoelectric conversion element also tends to decrease. That a photoelectric conversion element has a smaller area indicates that an amount of incident light per pixel becomes small. In, for example, an amplifying image sensing apparatus having a plurality of elements in one pixel, the area occupied by the photoelectric conversion element in each pixel is small. Hence, the incident light amount tends to be smaller.

To solve this problem, an image sensing apparatus in which a plurality of adjacent pixels (photoelectric conversion elements) share an electrical function has been proposed (Japanese Patent Laid-Open No. 10-256521). In this case, the element layout relationship near the photoelectric conversion element may change depending on the adjacent pixel.

An image sensing apparatus sometimes has defective pixels. A defective pixel outputs a signal (abnormal signal) that is largely different from a normal signal. Following methods of correcting such an abnormal signal have been proposed.

Japanese Patent Laid-Open No. 2001-045382 has proposed a defective pixel correction method for an image sensing apparatus in which a plurality of photoelectric conversion elements share an amplifying element. As shown in FIG. 17, four photodiodes a11, a12, a21, and a22 each functioning as a photoelectric conversion element share an amplifying element MSF. If one of the photodiodes is defective, the signal from the defective pixel is interpolated and then added.

An image sensing apparatus sometimes generates vertical stripe-shaped noise depending on its read circuit. A technique of solving this problem is known, which detects a fixed pattern noise component that reflects variations in the row direction of a read transistor by using a non-effective pixel having no photodiode as a dummy line, thereby canceling the fixed pattern noise component (Japanese Patent Laid-Open No. 2005-176061).

In the arrangement of Japanese Patent Laid-Open No. 10-256521, if a defective pixel signal is corrected by simply using the signals of neighboring pixels, as in general practice, the dark current difference may affect the result.

This is because the dark current affects the signals in different manners depending on the difference in the pixel structure. It is impossible to appropriately correct a signal when the influence of the dark current is large.

In the method disclosed in Japanese Patent Laid-Open No. 2001-045382 as well, a signal is interpolated using neighboring pixels and then added. In signal interpolation, however, the variations in the dark current caused by the difference in the pixel structure are not taken into consideration.

Particularly in signal correction in an optical black region (OB region) for outputting a black reference signal, the influence of the variations in the dark current is larger than in signal correction in an effective area for forming an image signal.

Japanese Patent Laid-Open No. 2005-176061 discloses a technique of canceling vertical stripe-shaped fixed pattern noise. However, this technique does not consider fixed pattern noise generated by pixel structures in an image sensing apparatus including a plurality of pixels having different pixel structures.

SUMMARY OF THE INVENTION

The present invention provides for satisfactorily correcting a signal even when the dark current varies between pixels.

The present invention also provides for accurately canceling fixed pattern noise generated by an unbalanced electrical characteristic of a read circuit or a circuit included in a pixel in an image sensing apparatus including a plurality of pixels having different pixel structures.

According to the first aspect of the present invention, there is provided an image capturing system comprising: a signal correction unit which corrects a signal output from a defective pixel in an optical black region having a plurality of pixels for outputting a dark reference signal, on the basis of a signal output from a normal pixel; wherein the optical black region has a plurality of pixel blocks, each of the plurality of pixel blocks has a plurality of pixels each including at least one element which has the same function as in the remaining pixels and which has a relative position different from the remaining pixels, and the signal correction unit corrects the signal output from the defective pixel in the optical black region on the basis of a signal output from a normal pixel which is included in another pixel block different from the pixel block of the defective pixel in the optical black region and includes at least one element having the same function and same relative position as in the defective pixel.

According to the second aspect of the present invention, there is provided an image capturing system comprising: a signal correction unit which corrects a signal output from a defective pixel in an optical black region having a plurality of pixels for outputting a dark reference signal, on the basis of a signal output from a normal pixel; wherein the optical black region has a plurality of pixel blocks, each of the plurality of pixel blocks has a plurality of pixels each including a plurality of transistors which have the same functions as in the remaining pixels and which have relative positions different from the remaining pixels, and the signal correction unit corrects the signal output from the defective pixel in the optical black region on the basis of a signal output from a normal pixel which is included in another pixel block different from the pixel block of the defective pixel in the optical black region and includes a plurality of transistors having the same functions and same relative positions as in the defective pixel.

According to the third aspect of the present invention, there is provided an image capturing system comprising: a signal correction unit which corrects a signal output from a defective pixel in an optical black region having a plurality of pixels for outputting a dark reference signal, on the basis of a signal output from a normal pixel; wherein the optical black region has a plurality of pixel blocks, each of the plurality of pixel blocks includes a plurality of pixels having different pixel structures, and the signal correction unit corrects the signal output from the defective pixel in the optical black region on the basis of a signal output from a normal pixel which is included in another pixel block different from the pixel block of the defective pixel in the optical black region and has the same pixel structure as in the defective pixel.

According to the fourth aspect of the present invention, there is provided a signal processing circuit having a signal correction unit which corrects a signal output from a defective pixel in an optical black region having a plurality of pixels for outputting a dark reference signal, on the basis of a signal output from a normal pixel, wherein the optical black region has a plurality of pixel blocks, each of the plurality of pixel blocks has a plurality of pixels each including at least one element which has the same function as in the remaining pixels and which has a relative position different from the remaining pixels, and the signal correction unit corrects the signal output from the defective pixel in the optical black region on the basis of a signal output from a normal pixel which is included in another pixel block different from the pixel block of the defective pixel in the optical black region and includes at least one element having the same function and same relative position as in the defective pixel.

According to the fifth aspect of the present invention, there is provided a signal processing circuit having a signal correction unit which corrects a signal output from a defective pixel in an optical black region having a plurality of pixels for outputting a dark reference signal, on the basis of a signal output from a normal pixel, wherein the optical black region has a plurality of pixel blocks, each of the plurality of pixel blocks includes a plurality of pixels having different pixel structures, and the signal correction unit corrects the signal output from the defective pixel in the optical black region on the basis of a signal output from a normal pixel which is included in another pixel block different from the pixel block of the defective pixel in the optical black region and has the same pixel structure as in the defective pixel.

According to the sixth aspect of the present invention, there is provided a signal processing method of an image sensing apparatus for correcting a signal output from a defective pixel in an optical black region having a plurality of pixel blocks each including a plurality of pixels for outputting a dark reference signal, each of the plurality of pixels including at least one element which has the same function as in the remaining pixels and which has a relative position different from the remaining pixels, the method comprising: a first step of determining whether a signal output from a target pixel is an abnormal output or an normal output; a second step of, when it is determined in the first step that the signal output from the target pixel is a normal output, recording the signal output from the target pixel, and an address of the target pixel as an address of a normal pixel; a third step of, when it is determined in the first step that the signal output from the target pixel is an abnormal output, determining the address of the target pixel as an address of a defective pixel; and a fourth step of correcting, based on the address of the normal pixel obtained in the second step and the address of the defective pixel obtained in the third step, the signal output from the defective pixel in the optical black region on the basis of a signal output from a normal pixel which is included in another pixel block different from the pixel block of the defective pixel in the optical black region and includes at least one element having the same function and same relative position as in the defective pixel.

According to the seventh aspect of the present invention, there is provided a signal processing method of an image sensing apparatus for correcting a signal output from a defective pixel in an optical black region having a plurality of pixel blocks each including a plurality of pixels for outputting a dark reference signal, the plurality of pixels having different pixel structures, the method comprising: a first step of determining whether a signal output from a target pixel is an abnormal output or an normal output; a second step of, when it is determined in the first step that the signal output from the target pixel is a normal output, recording the signal output from the target pixel, and an address of the target pixel as an address of a normal pixel; a third step of, when it is determined in the first step that the signal output from the target pixel is an abnormal output, determining the address of the target pixel as an address of a defective pixel; and a fourth step of correcting, based on the address of the normal pixel obtained in the second step and the address of the defective pixel obtained in the third step, the signal output from the defective pixel in the optical black region on the basis of a signal output from a normal pixel which is included in another pixel block different from the pixel block of the defective pixel in the optical black region and has the same pixel structure as in the defective pixel.

According to the eighth aspect of the present invention, there is provided an image capturing system comprising: a signal correction unit which corrects a signal output from an effective pixel including a photoelectric conversion element in an effective area on the basis of a signal output from a non-effective pixel including no photoelectric conversion element in a non-effective area, wherein the effective area has a plurality of effective pixel blocks, each of the plurality of effective pixel blocks has a plurality of effective pixels each including at least one element except the photoelectric conversion element, which has the same function as in the remaining effective pixels and which has a relative position different from the remaining effective pixels, the non-effective area has a plurality of non-effective pixel blocks, each of the plurality of non-effective pixel blocks has a plurality of non-effective pixels each including at least one element except the photoelectric conversion element, which has the same function as in the remaining non-effective pixels and which has a relative position different from the remaining non-effective pixels, and the signal correction unit corrects the signal output from the effective pixel in the effective area on the basis of a signal output from a non-effective pixel which is included in the non-effective area and includes at least one element except the photoelectric conversion element, which has the same function and same relative position as in the effective pixel.

According to the present invention, it is possible to satisfactorily correct a signal even when the dark current varies between pixels.

According to the present invention, it is also possible to accurately cancel fixed pattern noise generated by an unbalanced electrical characteristic of a read circuit or a circuit included in a pixel in an image sensing apparatus including a plurality of pixels having different pixel structures.

Further features of the present invention will become apparent from the following description of exemplary embodiments with reference to the attached drawings.

BRIEF DESCRIPTION OF THE DRAWINGS

FIG. 4 is a sectional view taken along a line X-X' in FIG. 3;

FIG. 14 is a conceptual view showing a pixel layout so as to explain a signal correction method according to Working Example 5;

DESCRIPTION OF THE EMBODIMENTS

Figure 1:
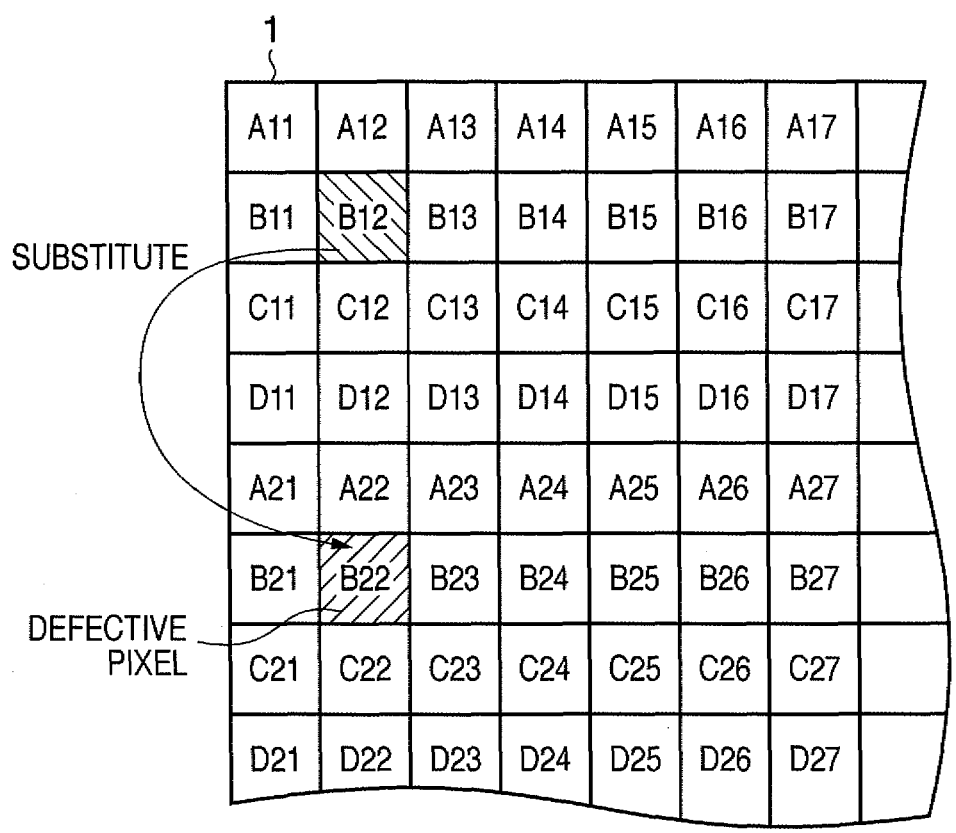
FIG. 1 is a conceptual view showing a pixel layout so as to explain an example of a pixel layout according to the present invention.

The present invention relates to signal processing of defective pixels in an image sensing apparatus and, more particularly, to signal correction in an image capturing system having an optical black region including a plurality of pixels having different pixel structures.

Terms to be used in the present invention will be defined. An optical black region has a plurality of pixel blocks. A pixel block is a unit formed by a plurality of pixels each including one or more elements (e.g., a photoelectric conversion element, a transfer transistor including a transfer gate, and the like) which have the same functions as in the remaining pixels but a different relative positional relationship. A pixel is a minimum unit for forming an image and includes at least a photoelectric conversion element (e.g., a photodiode).

The plurality of pixels included in each pixel block may share, for example, an amplifying element (e.g., amplification transistor) or individually have amplifying elements.

In the former case, each pixel of a pixel block may include a transfer transistor in addition to a photoelectric conversion element. At this time, each pixel block may be a unit including a plurality of pixels which have different relative positional relationships between, for example, the amplifying element shared by the plurality of pixels and the transfer transistors included in the pixels. Alternatively, each pixel block may be a unit including a plurality of pixels which have different relative positional relationships between, for example, the photoelectric conversion elements and the transfer transistors included in the pixels.

In the latter case, each pixel of a pixel block may include a transfer transistor in addition to a photoelectric conversion element, or a transfer transistor and an amplifying element in addition to a photoelectric conversion element. The amplifying element may include an amplification transistor and also a reset transistor and a selection transistor. At this time, each pixel block may be a unit including a plurality of pixels which have different relative positional relationships between, for example, the photoelectric conversion elements and other elements included in the pixels.

An optical black region has a plurality of pixel units. A pixel unit is a unit formed by a plurality of pixels each including one or more elements (e.g., a photoelectric conversion element, a transfer transistor, and the like) which have the same functions and same relative positional relationship as in the remaining pixels.

The image sensing apparatus has a signal correction unit which corrects the signal from a defective pixel in an optical black region based on the signal from a normal pixel which is included in a pixel block different from that of the defective pixel and includes one or more elements whose relative positional relationship is the same as in the defective pixel.

Even when a defective pixel exists in an optical black region, the above arrangement can correct the defective pixel while reducing the influence of variations in the dark current.

Variations in the dark current between pixels including one or more elements whose relative positional relationship is different will be described here. When the relative positional relationship between one or more elements included in a pixel changes, the influence of the dark current on a signal also changes. For example, the vicinity of a element isolation region or the surface of a semiconductor substrate includes many crystal defects and readily generates a dark current. The dark current changes depending on the relative positional relationship between these crystal defects and a signal charge channel that affects a signal.

That is, when the relative positional relationship between one or more elements changes, the relative positional relationship between the elements and the number of crystal defects serving as a dark current generation source changes. This makes the dark current vary.

Hence, if the signal from an abnormal pixel is corrected using the signal of a pixel which is close to the abnormal pixel but whose dark current differently affects the signal, the signal is affected by the variations in the dark current and cannot be corrected accurately.

On the other hand, the arrangement of the present invention can satisfactorily correct a signal while reducing the dark current. The effect is particularly large when the arrangement is used to correct a signal largely affected by the dark current. The arrangement can effectively be applied to correct a defective pixel in an optical black region (OB region) because the original signal is small, and the influence of the dark current on the signal is large.

The embodiment of the present invention will be described next in detail with reference to the accompanying drawings. FIG. 1 is a conceptual view showing a pixel layout so as to explain the present invention. The elements included in the pixels of rows A, B, C, and D have different relative positional relationships. These pixel rows are repeatedly arranged. A plurality of pixels included in the rows A, B, C, and D and arranged in the same column form one pixel block.

In this arrangement, for example, when B22 of a row B2 is a defective pixel, it is corrected using the signal of B12 which is included in a row B1 of a different pixel block and has the same relative positional relationship as in B22. This enables to correct a signal while reducing the influence of the variations in the dark current caused by the different relative positional relationship.

The present invention will be described below based on detailed working examples. The present invention is not limited to these working examples, and appropriate changes and combinations can be done within the above-described scope of the present invention.

WORKING EXAMPLE 1

In this example, four transfer gates share an amplifying element. The potential of the gate of an amplification transistor functioning as a common amplifying element is changed on the basis of charges from the four transfer gates.

Figure 2:
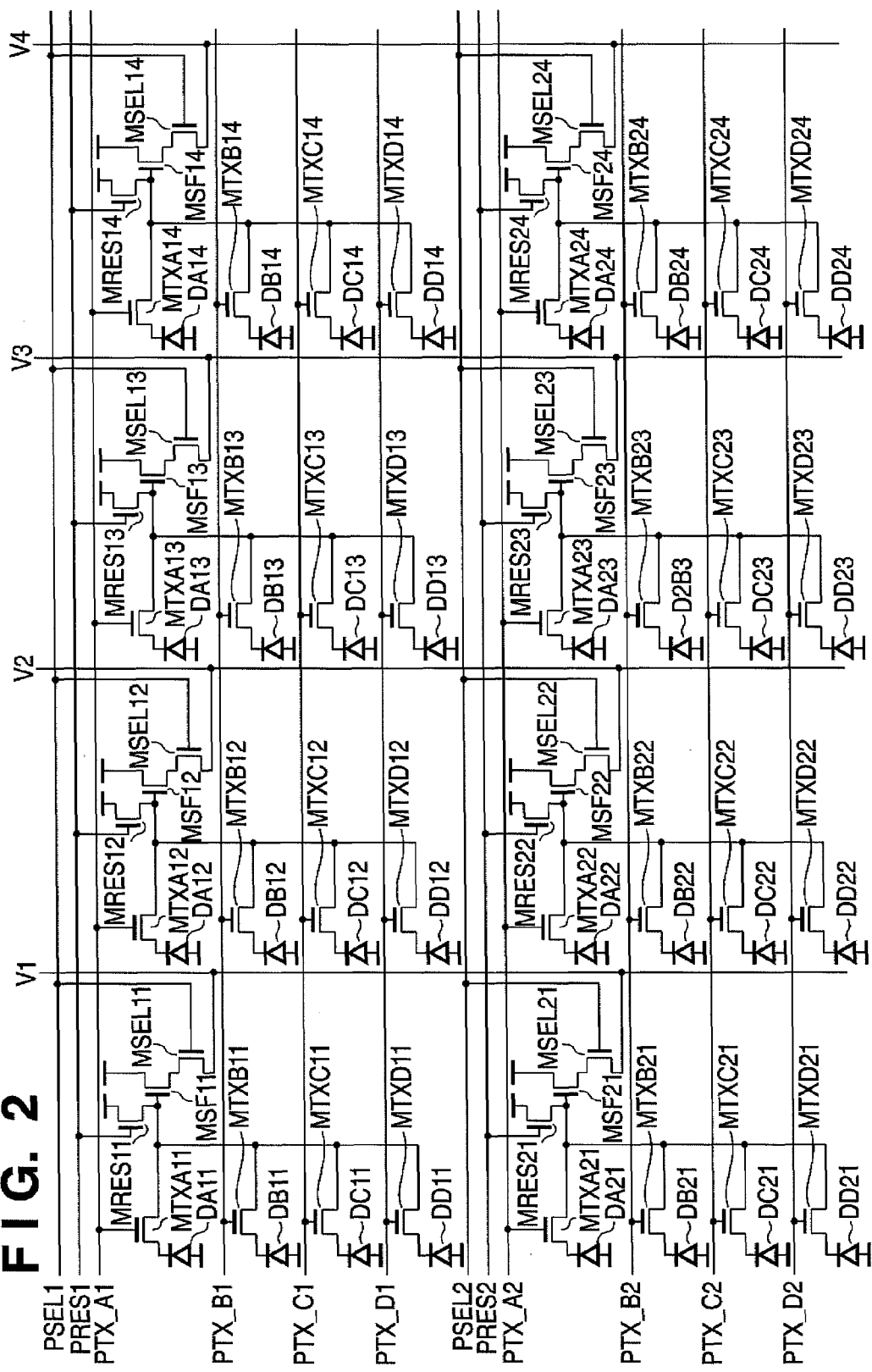
FIG. 2 is an equivalent circuit diagram of an image sensing apparatus according to Working Example 1.
Figure 3:
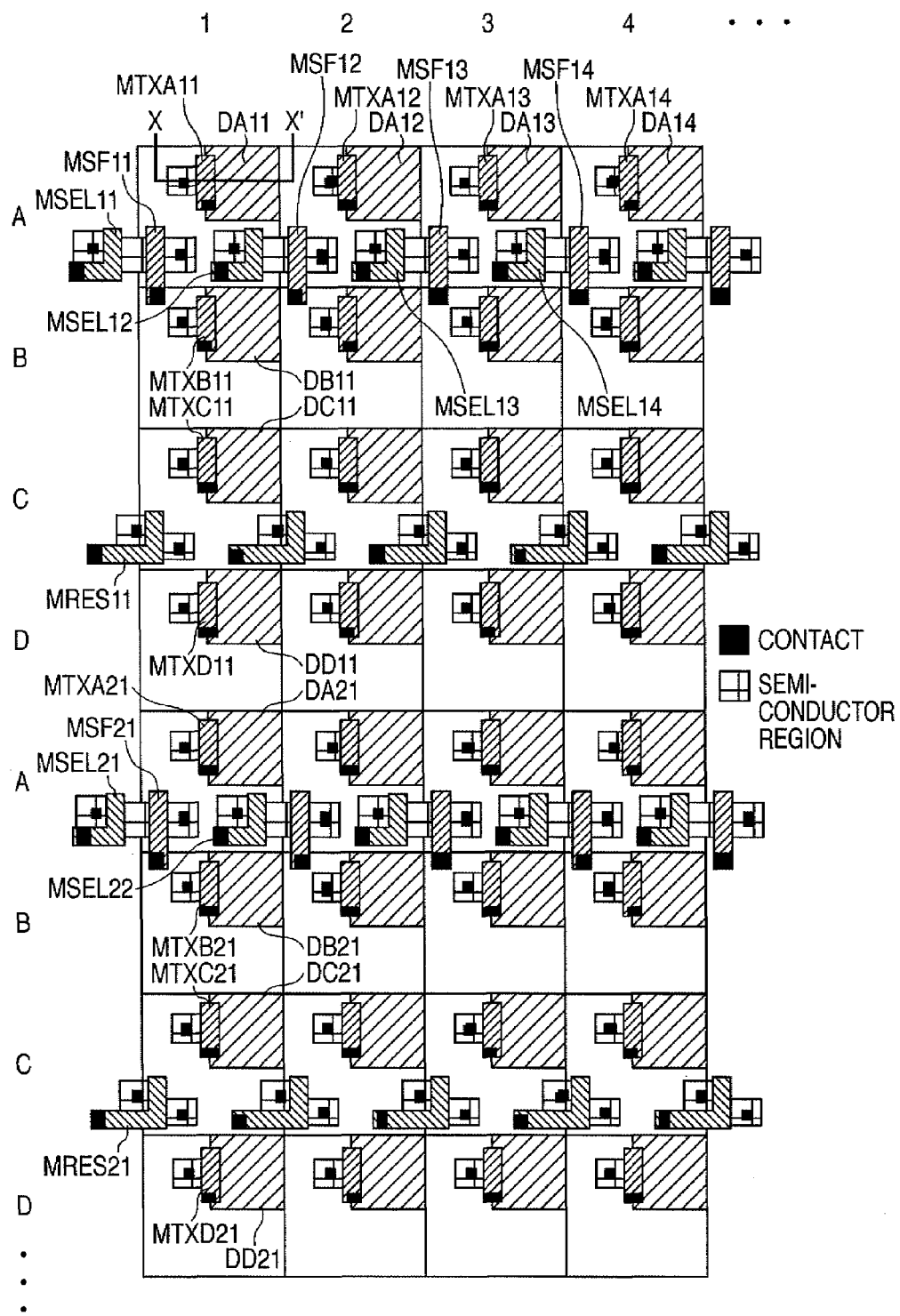
FIG. 3 is a plan view for explaining the pixel layout of the image sensing apparatus according to Working Example 1.

In this example, a plurality of transfer transistors (including transfer gates) share a reset transistor and a pixel selection transistor. FIG. 2 is an equivalent circuit. FIG. 3 is a view showing the pixel layout. FIG. 4 is a sectional view taken along a line X-X' in FIG. 3. These drawings illustrate only specific pixels. However, a number of pixels may be arranged in the row and column directions.

The circuit arrangement of the upper left pixel block (A11 to D11 shown in FIG. 1) will be described with reference to FIG. 2. The remaining pixel blocks have the same circuit arrangement as that of the upper left pixel block.

Photodiodes DA11 to DD11 have the same arrangement as that of a photoelectric conversion element in an effective area. In some cases, the region of the same conductivity type as signal charges is unnecessary (an n-type region is not always arranged for electrons). Each of transfer transistors MTXA11 to MTXD11 transfers charges to the input portion of the amplification transistor. A semiconductor region which has the same conductivity type as the signal charges and is arranged in the semiconductor substrate is usable as the input portion of the amplification transistor. A reset transistor MRES11 sets at least the potential of the input portion of the amplification transistor at a reference potential. An amplification transistor MSF11 amplifies the signal charges. A selection transistor MSEL11 selectively reads out the amplified signal.

Each of control lines PTX_A1 to PTX_D1 applies a pulse to the control electrode of a corresponding one of the transfer gates. Control lines PRES1 and PSEL1 apply pulses to the control electrodes of the reset transistor and selection transistor, respectively.

The four pixels including the transfer transistors MTXA11 to MTXD11 (including transfer gate; i.e. gate electrode) form one pixel block. The pixels share MSF11, MRES11, and MSEL11. A plurality of such pixel blocks are arranged in the row and column directions. A common control line controls transfer transistors MTXA11 corresponding to DA in the pixel blocks repeatedly arranged in the column direction. The common control line also controls the transfer transistors MTXB11 to MTXD11 corresponding to DB, DC, and DD.

The layout arrangement of the upper left pixel block (A11 to D11 shown in FIG. 1) will be described with reference to FIG. 3. The remaining pixel blocks have the same layout arrangement as that of the upper left pixel block.

Referring to FIG. 3, wide diagonal-hatched regions indicate diffusion regions corresponding to the photoelectric conversion elements DA11 to DD11. Cross-hatched regions indicate semiconductor regions serving as the electrode regions of the transistors MTXA11 to MTXD11, MSF11, MRES11, and MSEL11. Narrow diagonal-hatched regions indicate the gate electrodes of the transistors MTXA11 to MTXD11, MSF11, MRES11, and MSEL11. Solid regions indicate the contact regions to the interconnections of the upper layer. The remaining regions are basically the element isolation regions.

Each region defined by the horizontal and vertical lines corresponds to a pixel. The plurality of elements included in the pixels of the pixel rows A, B, C, and D have different relative positional relationships.

In this example, the plurality of elements included in a pixel are the transfer transistor MTX, amplification transistor MSF, reset transistor MRES, and selection transistor MSEL. The transfer transistors have the same positional relationship in the plurality of pixels to individually transfer charges to the input portion of the amplification transistor.

FIG. 4 is a conceptual sectional view of the element. Reference numeral 401 denotes a p-type semiconductor region. An n-type semiconductor region 402 accumulates signal charges. A p-type semiconductor region 403 reduces a dark current. The semiconductor regions 401, 402, and 403 form a diode corresponding to a photoelectric conversion element in an effective area. The n-type semiconductor region 402 may have a volume smaller than the corresponding region in the effective area or may be omitted.

A transfer gate 404 (serving as the gate electrode of a transfer transistor) transfers charges. An n-type semiconductor region (floating diffusion region) 405 receives charges and functions as the input portion of the amplification transistor. A element isolation region 406 isolates adjacent elements. The regions 402, 404, and 405 form, for example, the transfer transistor MTXA11.

It should be noted that the conductivity types in FIG. 4 may be reversed to handle holes as signal charges.

The relative positional relationship between the plurality of transistors included in each pixel and the relative positional relationship between the plurality of transistors and the element isolation region and the like are largely different between DA, DB, DC, and DD.

More specifically, a pixel block which includes a plurality of transfer gates sharing a specific element has four pixels having different relative positional relationships between the plurality of elements included in the pixels. A region that accumulates charges and a channel serving as a charge moving path are easily affected by the dark current.

Figure 5:
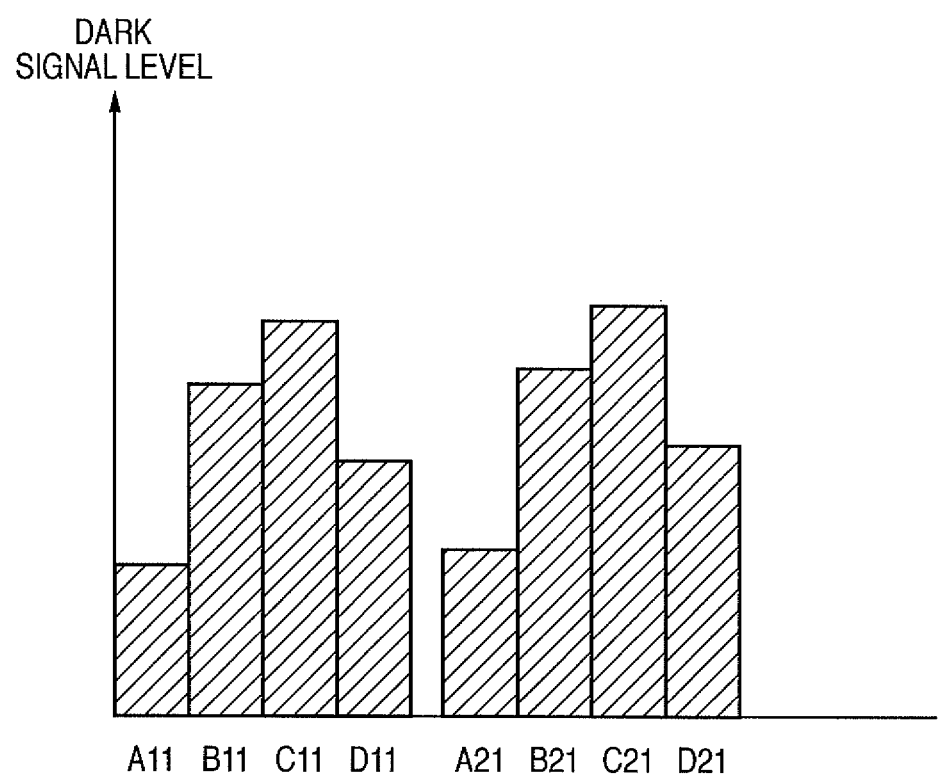
FIG. 5 is a graph for explaining the dependence of a dark signal level on the pixel structure.

FIG. 5 shows an example of the dependence of a dark signal on the pixel structure. The optical black region basically has no charges by photoelectric conversion. Hence, the variations in the dark signal shown in FIG. 5 are largely affected by the variations in the dark current caused by the different relative positional relationships between the plurality of elements included in the pixels. As is apparent from FIG. 5, the outputs from the pixels A, B, C, and D are largely different.

If a defective pixel is corrected using the signal of an adjacent pixel which has relative positional relationship different from that of the defective pixel without considering the relative positional relationships between the plurality of elements included in the pixels, no satisfactory correction result can be obtained because the pixel used for correction outputs a different dark signal. To the contrary, when a defective pixel is corrected using the signal of a pixel which is not close to the defective pixel but includes a plurality of elements having the same functions and the same relative positional relationship as in the defective pixel, the influence of the variations in the dark current can be reduced.

In this example, a defective pixel is corrected based on the signal from a normal pixel which is included in a pixel block different from that of the defective pixel and includes a plurality of elements whose relative positional relationship is the same as in the defective pixel. More specifically, when the pixel A21 outputs an abnormal signal, it can be corrected using the signal of the pixel A11 while reducing the influence of the variations in the dark current.

Figure 6:
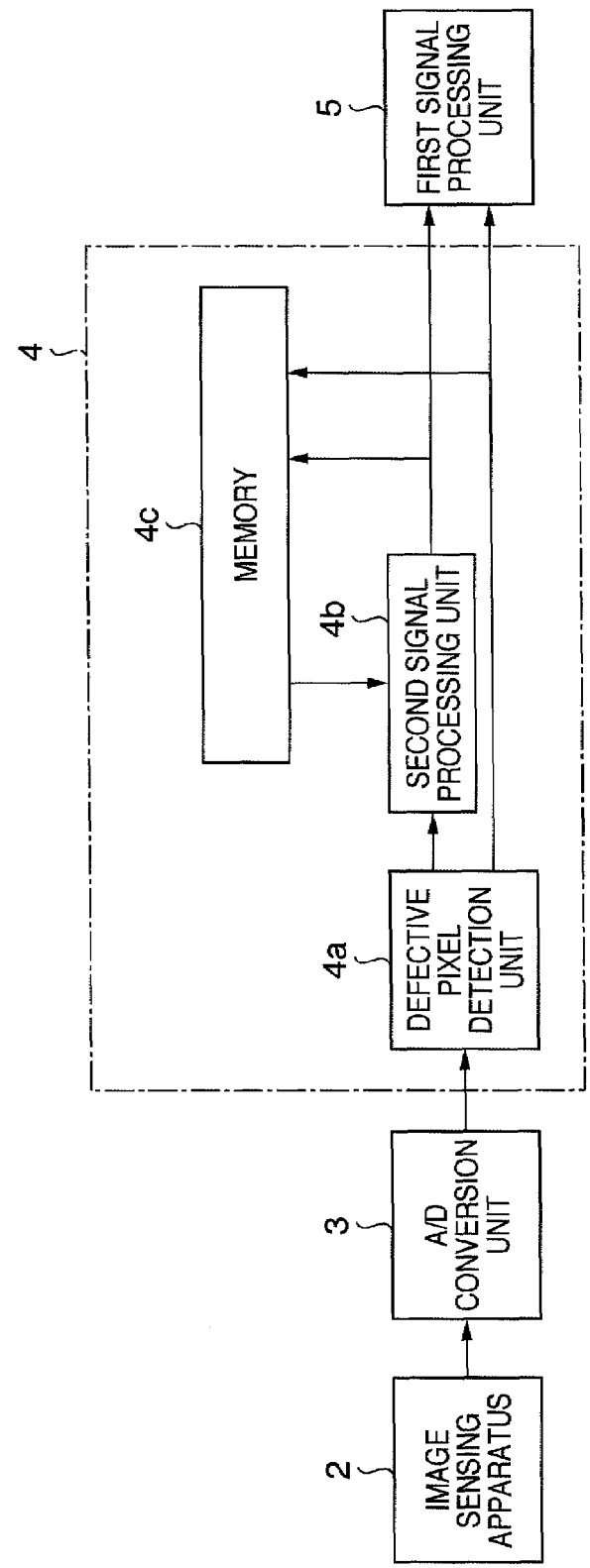
FIG. 6 is a block diagram of an image capturing system according to Working Example 1.

FIG. 6 is a block diagram of an image capturing system according to this example. A sequence of detecting an abnormal signal from, for example, a defective pixel and correcting it using the signal of a different pixel will be described. The image capturing system includes the following constituent elements.

An image sensing apparatus 2 functions as an image signal forming unit which outputs an image signal. An A/D conversion unit 3 converts the analog signal output from the image sensing apparatus 2 into a digital signal. Reference numeral 4 denotes a signal correction unit. A first signal processing unit 5 executes signal processing after defect correction.

Figure 7:
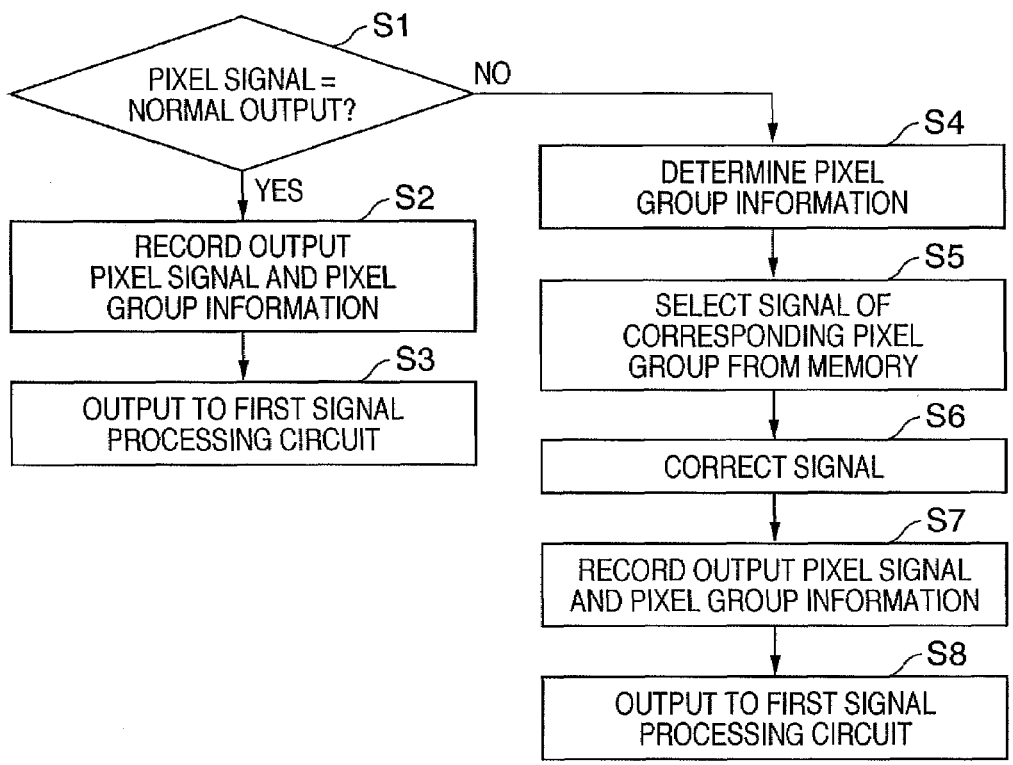
FIG. 7 is a flowchart illustrating signal correction according to Working Example 1.

A detailed sequence will be described with reference to FIG. 7.

First, the signal correction unit 4 determines whether the signal from a target pixel is an abnormal output or normal output (first step S1). If the signal is a normal output, the signal correction unit 4 records the signal of the normal output pixel and the address information (pixel group information) of the normal output pixel (second step S2). The signal correction unit 4 directly outputs the signal of the normal output pixel to the first signal processing unit 5 (step S3).

On the other hand, if the signal is an abnormal output, the signal correction unit 4 determines the address information (pixel group information) of the abnormal output pixel (third step S4). In accordance with the determination result in the third step S4, the signal correction unit 4 selects a corresponding pixel group by referring to the memory based on the address information (pixel group information) obtained in the second step S2 (step S5). The signal correction unit 4 corrects the signal of the abnormal output pixel using the signal of the corresponding pixel group (fourth step S6). The signal correction unit 4 records the signal of the abnormal output pixel and the address information (pixel group information) of the abnormal output pixel (step S7). The signal correction unit 4 outputs the signal of the abnormal output pixel to the first signal processing unit 5 (step S8). As the address information (pixel group information), at least information about the pixel structure is recorded.

The signal correction unit 4 shown in FIG. 6 will be described in more detail. The signal correction unit 4 has a defective pixel detection unit 4a which detects whether an input signal is an abnormal signal output from, for example, a defective pixel. For example, a differential circuit compares a reference value with a signal output from a pixel, and the defective pixel detection unit 4a detects a defective pixel based on the comparison result. When the defective pixel detection unit 4a determines that the signal is abnormal and thereby a pixel defect exists, the defective pixel detection unit 4a sends the signal to the second signal processing unit 4b, and the second signal processing unit 4b of the succeeding stage corrects the signal. When the defective pixel detection unit 4a determines that the signal is normal, the defective pixel detection unit 4a sends the signal not to the second signal processing unit 4b but to the first signal processing unit 5. Simultaneously, the signal and the address information of the pixel are stored in a memory 4c. The signal stored in the memory 4c is used to correct an abnormal signal output from another pixel later.

A signal is recorded in the memory together with its address information to make it possible to discriminate the pixel structure of the pixel which has output the signal.

A CPU (not shown) executes the series of control processes for the memory and signal processing units such that an abnormal signal is corrected using the signal from a pixel which has the same pixel structure as the pixel that has output the abnormal signal.

For signal correction, a signal may be interpolated by directly substituting the pixel signal. Alternatively, a pixel signal to be substituted may be corrected and then substituted.

As described above, according to the arrangement of this example, it is possible to correct a signal while reducing the influence of the variations in the dark current in an image capturing system having a plurality of pixels with different pixel structures. That is, it is possible to satisfactorily correct a signal while reducing the influence of the variations in the dark current in an image capturing system having an optical black region including a plurality of pixels with different pixel structures.

WORKING EXAMPLE 2

Figure 8:
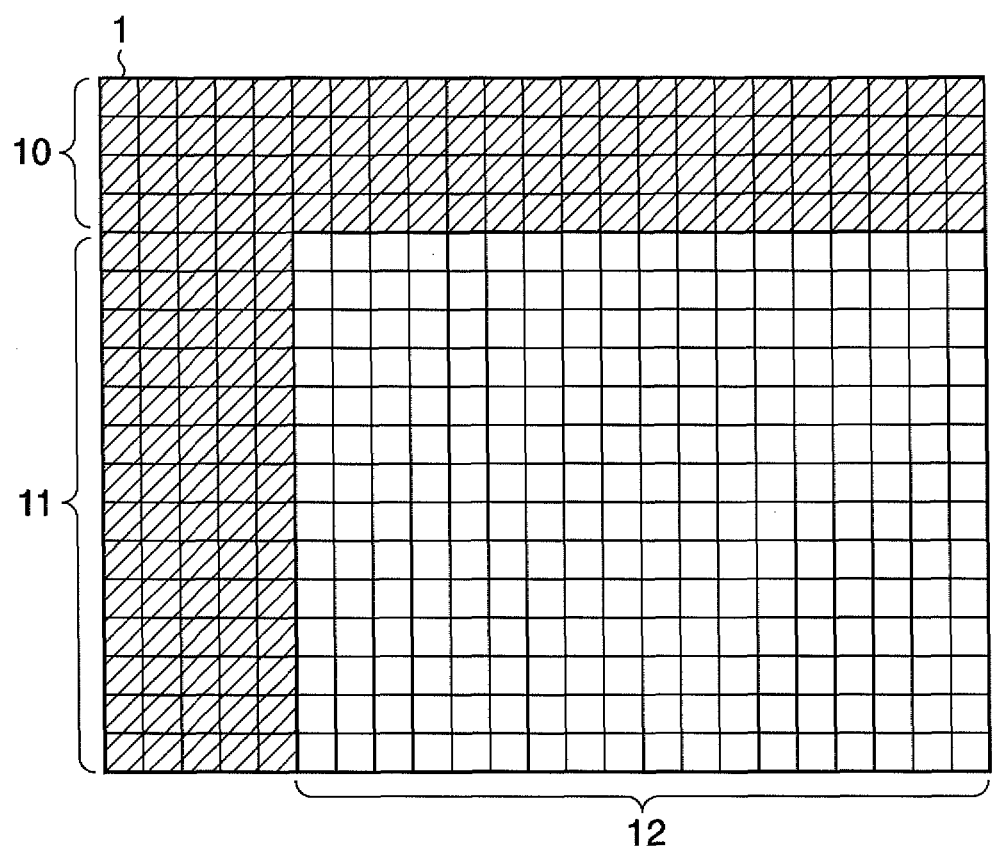
FIG. 8 is a conceptual view showing a pixel layout so as to explain a pixel layout according to Working Examples 2 and 3.

In this example, a signal correction method related to an optical black pixel for outputting a black reference signal (dark reference signal) will be described. FIG. 8 shows the pixel layout of an image sensing apparatus.

Referring to FIG. 8, reference numeral 1 denotes a pixel; 10, a first OB region (vertical OB region); 11, a second OB region (horizontal OB region); and 12, an effective area adjacent to the optical black regions 10 and 11. A dark current is corrected by generating a black reference signal using these OB regions. When a dark signal distribution (vertical shading) generated by the influence of a dark current exists in the vertical direction, the shading can be reduced by executing correction using signals from the horizontal OB region 11. When a dark signal distribution (horizontal shading) generated by the influence of a dark current exists in the horizontal direction, correction can be done using signals from the vertical OB region 10.

Figure 9:
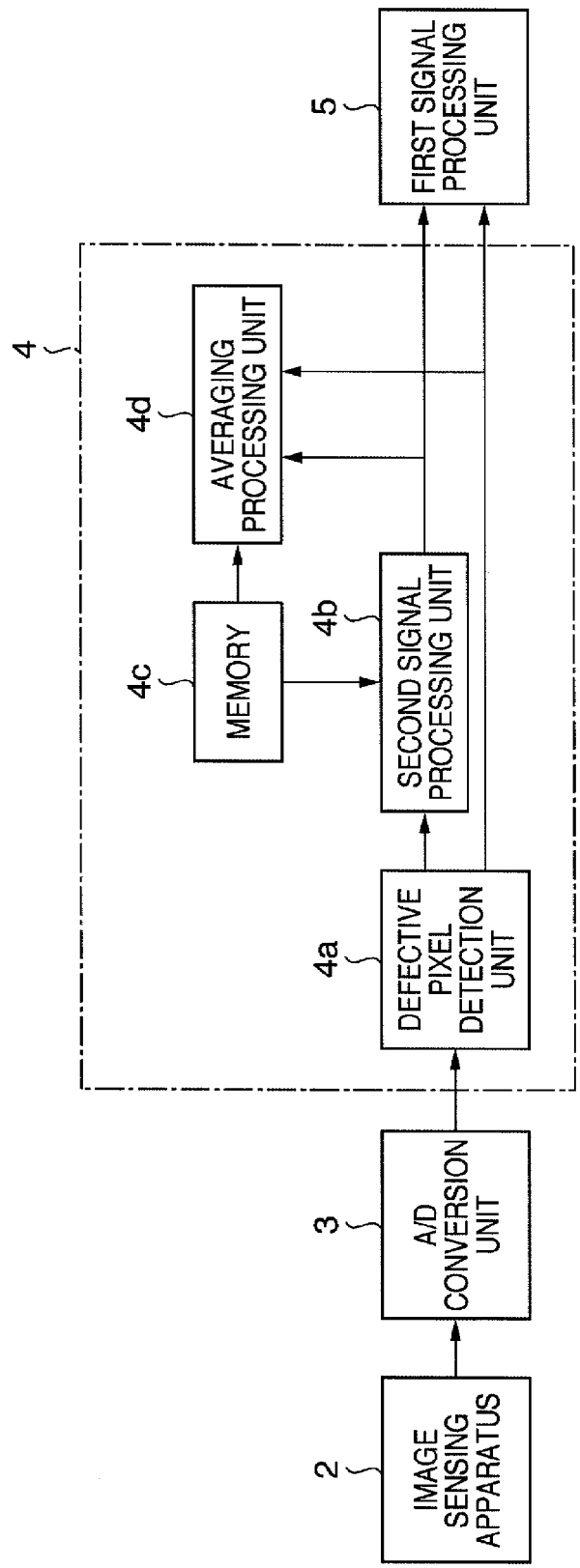
FIG. 9 is a block diagram of an image sensing apparatus according to Working Examples 2 and 3.

FIG. 9 is a block diagram of the image sensing apparatus. Working Example 2 is different from Working Example 1 in that the signals from a plurality of pixels (a pixel group included in at least part of a pixel unit) are averaged before they are recorded in a memory. The signals from normal pixels, or the signals from normal pixels and signals obtained by correcting abnormal signals are averaged. The pixel signals are recorded in the memory together with address information representing the pixel line to which the plurality of averaged pixel signals belong.

Figure 10:
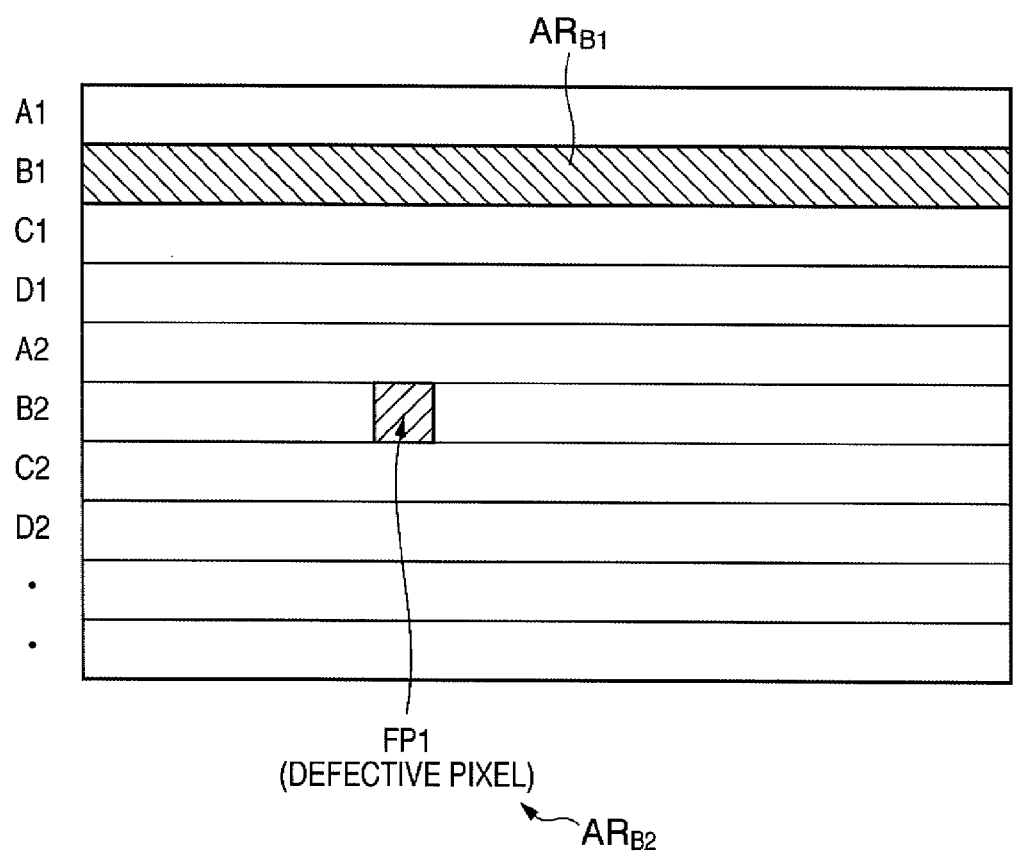
FIG. 10 is a conceptual view showing a pixel layout so as to explain a signal correction method according to Working Example 2.

In this example, a case in which a defective pixel FP1 exists in the horizontal OB region 11 will be described. FIG. 10 is an enlarged view of the horizontal OB region 11 in FIG. 8. The same arrangement as in Working Example 1 is usable as a detailed pixel layout. Referring to FIG. 10, when the defective pixel FP1 is detected in a pixel unit $AR_{B2}$ of a row B2, the signal of the defective pixel is corrected using the average value of the signals of a pixel group (e.g., all pixels) included in a pixel unit $AR_{B1}$ of a row B1. The memory records the average signal from the pixel group and information representing the pixel row including that pixel group. Hence, a second signal processing unit 4b corrects the signal based on the address information in the memory in accordance with an instruction from a CPU (not shown).

In this example, the memory records the average value of the signals from a pixel group included in at least part of a pixel unit. This further facilitates the memory configuration as compared to Working Example 1.

WORKING EXAMPLE 3

This example is related to a signal correction method when a pixel defect is generated in a vertical OB region 10. This example can also use the block diagram of the image sensing apparatus in FIG. 9.

Figure 11:
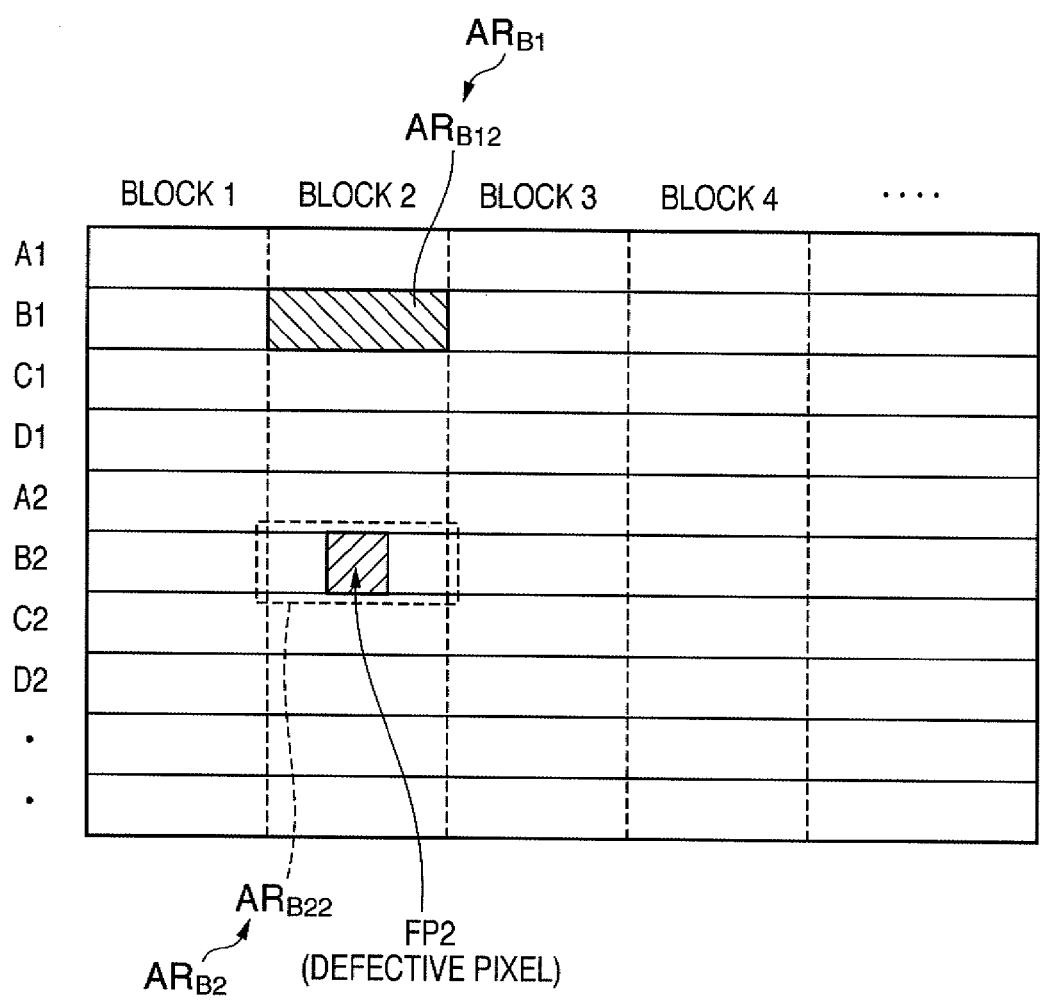
FIG. 11 is a conceptual view showing a pixel layout so as to explain a signal correction method according to Working Example 3.

FIG. 11 is an enlarged view of the vertical OB region 10. The same arrangement as in Working Example 1 is usable as a pixel layout, as in Working Example 2.

In Working Example 3, a pixel row is further divided into a plurality of regions (block 1, block 2, . . . ) in the horizontal direction. The signals from a plurality of pixels in each region are averaged and recorded in a memory. Simultaneously, pieces of address information representing the pixel row and the divided regions are recorded.

An averaging processing unit 4d in FIG. 9 adds the signals from a plurality of pixels in each region divided in the horizontal direction, calculates the average value, and records it in a memory 4c together with address information. The memory 4c records the average signal of each region divided in the horizontal direction for each pixel row. A pixel signal determined by a defective pixel detection unit 4a as a defective pixel is corrected by a second signal processing unit 4b. The second signal processing unit 4b corrects the signal by acquiring the average value of a region including a pixel having the same pixel structure but included in a different pixel block.

For example, the region of a pixel group included in part of a pixel unit $AR_{B2}$ of a row B2 is represented by $AR_{B22}$ in FIG. 11. The region of a pixel group included in part of a pixel unit $AR_{B1}$ of a row B1 is represented by $AR_{B12}$. When a defective pixel FP2 exists in the pixel group region $AR_{B22}$, the signal is corrected using the average signal of the pixel group region $AR_{B12}$ which is included in part of another pixel unit and also includes a pixel having one or more elements which have the same functions and the same relative positional relationship as in the defective pixel FP2. After signal correction of the defective pixel FP2 of the row B2, the average value of the pixel signals of the pixel group region $AR_{B22}$ of the row B2 is also recorded in the memory.

According to this example, it is possible to obtain the accurate black level of each column of the vertical OB region 10 and execute satisfactory correction.

WORKING EXAMPLE 4

In this example, a pixel block formed by a plurality of pixels including photodiodes which serve as photoelectric conversion elements and have different areas will be described as an example of a pixel block including different pixel structures. As the block diagram of the image capturing system, the same arrangement as in FIG. 6 is usable. The process sequence shown in FIG. 7 is usable.

Figure 12:
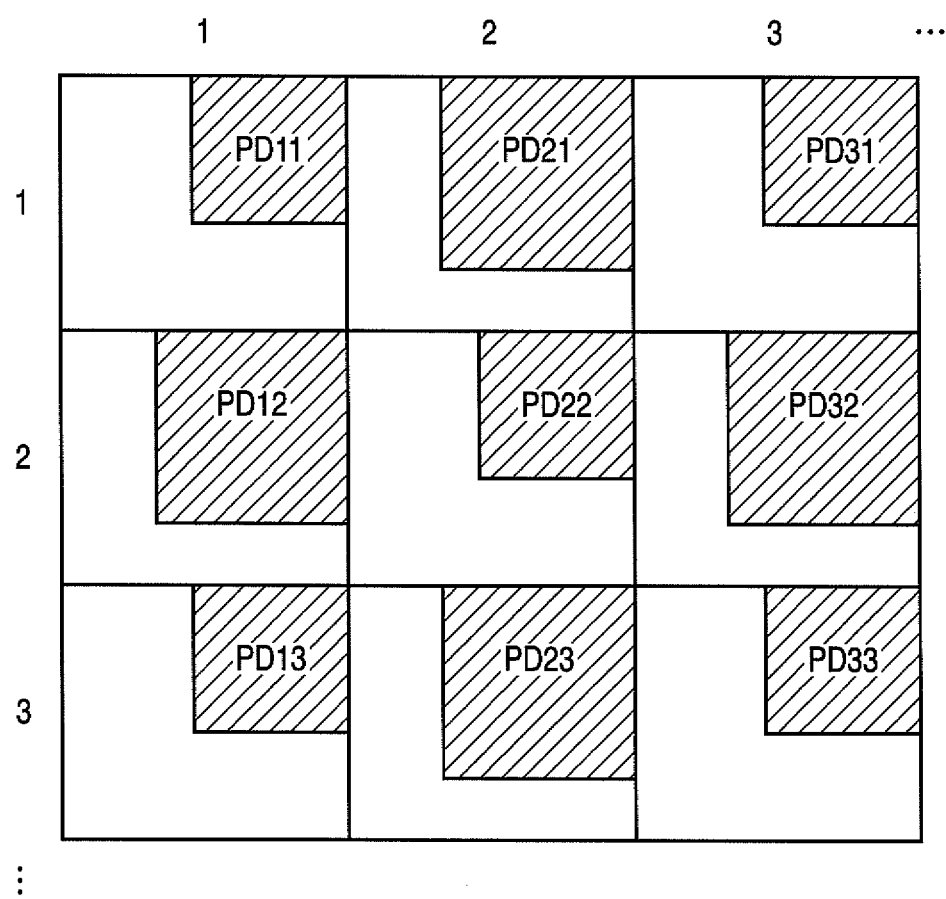
FIG. 12 is a conceptual view for explaining a pixel layout according to Working Example 4.

FIG. 12 is a plan view of an image sensing apparatus of this example. Photodiodes PD11 to PD33 function as photoelectric conversion elements. Other elements such as transistors and electrodes included in the pixels are not illustrated. For example, the pairs of PD11 and PD21, PD12 and PD22, and PD13 and PD23 form pixel blocks. A pixel 1 forms its signal using the signals from two photodiodes, that is, photoelectric conversion elements having different areas. This arrangement can widen the dynamic range. When the occupation ratio of the photoelectric conversion element area in a pixel region changes, the influence of the dark current on the signal also changes. If, for example, PD23 is a defective pixel, its signal is corrected using the signal of the pixel PD21 which is a normal pixel in a different pixel block and has the same pixel structure as the defective pixel. This allows correcting a signal while reducing the influence of the variations in the dark current even when a pixel block is formed by a plurality of pixels having different photoelectric conversion element areas.

The present invention has been described above in detail. In all examples, the A/D conversion unit or first signal processing unit can include the defect correction unit. In addition, the whole arrangement including the image capturing system can be formed in one chip.

In the above-described signal correction methods, a defective pixel is detected after A/D conversion. However, the present invention is not limited to this. A defective pixel may be detected from an analog signal. It is also possible to correct an analog pixel signal.

A signal output from an OB region may be clamped as an analog signal. Alternatively, A/D conversion may be executed using the signal output from the OB region as a reference signal of the A/D conversion unit.

The above examples have been explained in association with an amplifying image sensing apparatus. However, the present invention is not limited to this and is also applicable to, for example, a CCD having a plurality of pixel groups in which the photoelectric conversion elements have different areas.

WORKING EXAMPLE 5

This example is related to a method of accurately canceling fixed pattern noise generated by an unbalanced electrical characteristic of a read circuit or a circuit included in a pixel in an image sensing apparatus including a plurality of pixels having different pixel structures.

Figure 13:
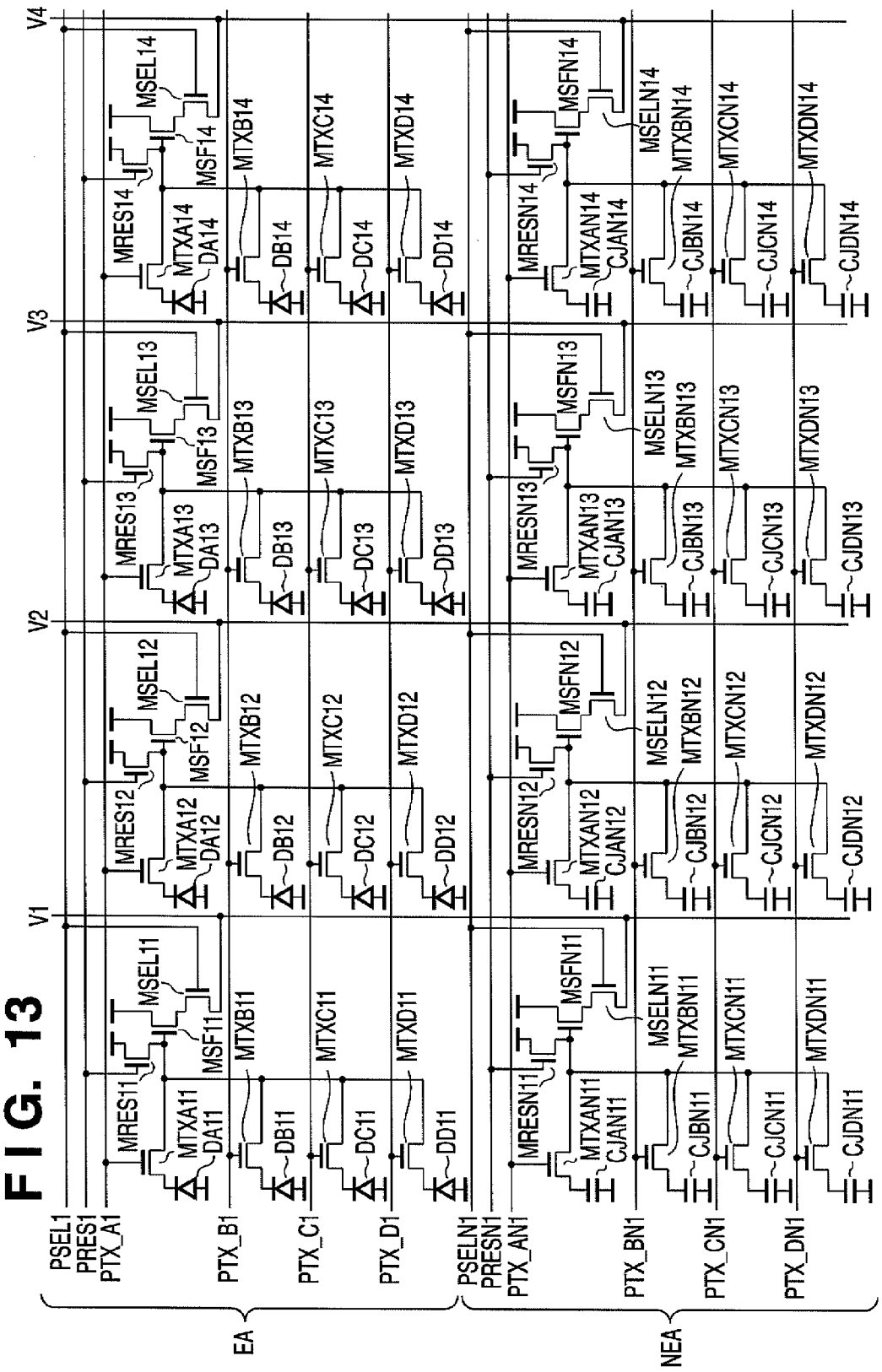
FIG. 13 is an equivalent circuit diagram showing a pixel arrangement according to Working Example 5.

FIG. 13 is an equivalent circuit diagram showing a pixel arrangement according to Working Example 5. The pixel array includes an effective area EA where a plurality of effective pixels are arranged, and a non-effective area NEA where a plurality of non-effective pixels are arranged. An effective pixel has the same structure as in FIG. 1 and includes a photoelectric conversion element. On the other hand, a non-effective pixel includes no photoelectric conversion element.

In a non-effective pixel AN11, for example, as shown in FIG. 13, a transfer transistor MTXAN11 connected to an amplification transistor MSFN11 is connected not to a photoelectric conversion element but to a parasitic capacitance CJAN11 of the transistor. In a non-effective pixel BN11, for example, as shown in FIG. 13, a transfer transistor MTXBN11 connected to the amplification transistor MSFN11 is connected not to a photoelectric conversion element but to a parasitic capacitance CJBN11 of the transistor. In a non-effective pixel CN11, for example, as shown in FIG. 13, a transfer transistor MTXCN11 connected to the amplification transistor MSFN11 is connected not to a photoelectric conversion element but to a parasitic capacitance CJCN11 of the transistor. In a non-effective pixel DN11, for example, as shown in FIG. 13, a transfer transistor MTXDN11 connected to the amplification transistor MSFN11 is connected not to a photoelectric conversion element but to a parasitic capacitance CJDN11 of the transistor.

That is, four pixels including four transfer transistors corresponding to one amplification transistor form one pixel block. The position of an effective pixel A11 in effective pixel blocks (A11 to D14) corresponds to that of the non-effective pixel AN11 in the non-effective pixel blocks (AN11 to DN14). These pixels will be compared as an example. The positional relationship (relative positional relationship) between the amplification transistor and the transfer transistor in the effective pixel A11 is the same as that between the amplification transistor and the transfer transistor in the non-effective pixel AN11.

FIG. 14 is a conceptual view of the pixel layout shown in FIG. 13. The effective area EA has a plurality of effective pixel blocks (A11 to D11), (A12 to D12), (A13 to D13), and (A14 to D14). The non-effective area NEA has a plurality of non-effective pixel blocks (AN11 to DN11), (AN12 to DN12), (AN13 to DN13), and (AN14 to DN14).

The effective pixel A11 includes a transfer transistor MTXA11. The effective pixel B11 includes a transfer transistor MTXB11. The effective pixel C11 includes a transfer transistor MTXC11. The effective pixel D11 includes a transfer transistor MTXD11.

The non-effective pixel AN11 includes the transfer transistor MTXAN11. The non-effective pixel BN11 includes the transfer transistor MTXBN11. The non-effective pixel CN11 includes the transfer transistor MTXCN11. The non-effective pixel DN11 includes the transfer transistor MTXDN11.

In this example, the non-effective pixels AN11 to DN11 are used as a dummy line. Pixel signals read out from the dummy line are used as the measurement signals of the fixed pattern noise component. Not only the fixed pattern noise component but also a random noise component is superimposed on the pixel signals read out from the dummy line. To suppress the random noise component, the signals are read out multiple times from the dummy line and averaged in each column. In averaging signals in each column, pixel signals read out from the non-effective pixels AN11 to AN14 multiple times are averaged in each column, thereby generating correction data. Similarly, pixel signals read out from the non-effective pixels BN11 to BN14, CN11 to CN14, and DN11 to DN14 multiple times are averaged in each column, thereby generating correction data.

The correction data obtained by averaging the pixel signals read out from the non-effective pixels AN11 to AN14 is subtracted from the pixel signals read out from the effective pixels A11 to A14, thereby canceling the fixed pattern noise component. In a similar manner, the correction data obtained by averaging the pixel signals read out from the non-effective pixels BN11 to BN14 is subtracted from the pixel signals read out from the effective pixels B11 to B14, thereby canceling the fixed pattern noise component. The correction data obtained by averaging the pixel signals read out from the non-effective pixels CN11 to CN14 is subtracted from the pixel signals read out from the effective pixels C11 to C14, thereby canceling the fixed pattern noise component. The correction data obtained by averaging the pixel signals read out from the non-effective pixels DN11 to DN14 is subtracted from the pixel signals read out from the effective pixels D11 to D14, thereby canceling the fixed pattern noise component.

As described above, according to this example, fixed pattern noise caused by, for example, the parasitic capacitance and parasitic resistance depending on the layout relationship between the transistors of the effective pixels is canceled using the correction data of the dummy line equivalent to the effective pixels. This also enables satisfactorily canceling the fixed pattern noise unique to the pixel unit.

WORKING EXAMPLE 6

This example is related to a method of accurately canceling fixed pattern noise generated when adding and reading out the signals of a plurality of pixels arranged vertically in each column in an image sensing apparatus including a plurality of pixels having different pixel structures.

Figure 15:
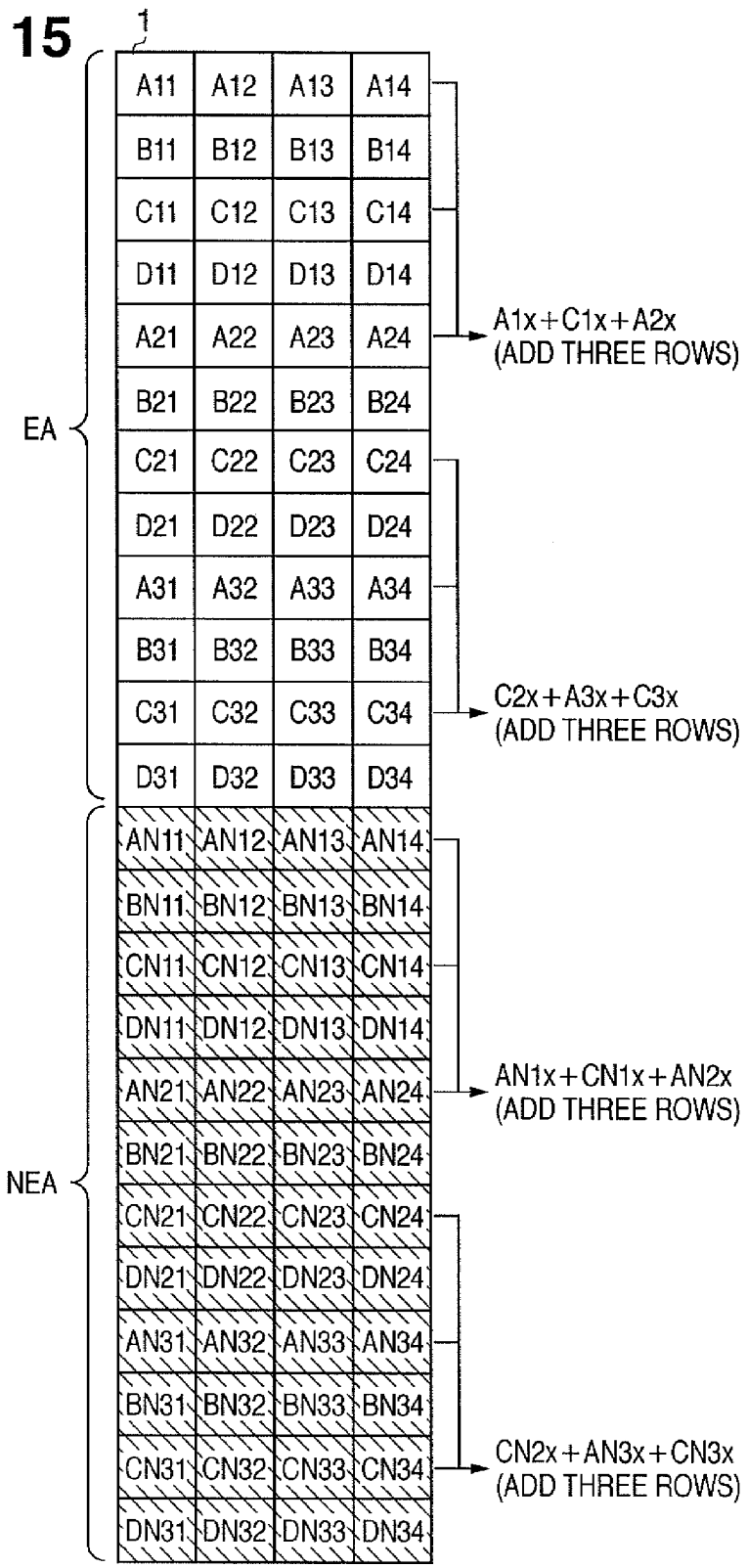
FIG. 15 is a conceptual view showing a pixel layout so as to explain a signal correction method according to Working Example 6.

FIG. 15 is a conceptual view of the pixel layout according to this example. The pixel layout includes effective pixels A11 to D34 and non-effective pixels AN11 to DN34. Rows A, B, C, and D are arranged by threes. Rows AN, BN, CN, and DN are also arranged by threes.

In this example, a signal processing unit includes a first addition unit (not shown), a second addition unit (not shown), and a signal correction unit 4 (FIG. 6).

The first addition unit adds signals output from a plurality of effective pixels to generate the sum signal of the effective pixels. For example, the first addition unit adds the signal output from the first effective pixel and the signal output from the second effective pixel in the effective area. The first addition unit thus generates the first sum signal of the effective pixels.

The second addition unit adds signals output from a plurality of non-effective pixels to generate the sum signal of the non-effective pixels. For example, the second addition unit adds the signal output from the first non-effective pixel which includes one or more elements having the same functions and the same relative positional relationship as in the first effective pixel, and the signal output from the second non-effective pixel equal to the second effective pixel. The second addition unit thus generates the first sum signal of the non-effective pixels.

The signal correction unit 4 corrects the first sum signal of the effective pixels based on the first sum signal of the non-effective pixels. For example, the signal correction unit 4 subtracts a signal obtained by averaging the first sum signals of the non-effective pixels in each column from the first sum signal of the effective pixels, thereby correcting the first sum signal of the effective pixels.

A case in which the signals of three pixels vertically arranged, that is, three rows are added while alternately skipping the rows will be described here. The sum signal of the first row corresponds to the sum signal of effective pixels obtained by adding the signals output from the row (row A1) of the effective pixels A11 to A14, the row (row C1) of the effective pixels C11 to C14, and the row (row A2) of the effective pixels A21 to A24. The sum signal of the next row corresponds to the sum signal of effective pixels obtained by adding the signals output from the row (row C2) of the effective pixels C21 to C24, the row (row A3) of the effective pixels A31 to A34, and the row (row C3) of the effective pixels C31 to C34. Focus will be placed on the first column. The sum signal of the first row is obtained by adding the signals output from the effective pixels A11, C11, and A21. The sum signal of the next row is obtained by adding the signals output from the effective pixels C21, A31, and C31. The combinations of the structures of the added pixels are different. Subsequently, for the non-effective pixels, the signals output from the pixels of three rows are added in the same way. First, the sum signal of the non-effective pixels of one row is obtained by adding the signals output from the row (row AN1) of the non-effective pixels AN11 to AN14, the row (row CN1) of the non-effective pixels CN11 to CN14, and the row (row AN2) of the non-effective pixels AN21 to AN24. Next, the sum signal of the non-effective pixels of one row is obtained by adding the signals output from the row (row CN2) of the non-effective pixels CN21 to CN24, the row (row AN3) of the non-effective pixels AN31 to AN34, and the row (row CN3) of the non-effective pixels CN31 to CN34. The sum signals of the non-effective pixels are used as correction data. More specifically, the signals output from the plurality of non-effective pixels are read out multiple times. Sum signals obtained by combining, of the pixel signals read out multiple times, the signals of the rows AN, CN, and AN are averaged in each column, thereby generating correction data. Similarly, sum signals obtained by combining the signals of the rows CN, AN, and CN are averaged in each column, thereby generating correction data.

The correction data generated by averaging the sum signals of the non-effective pixels obtained by adding the signals output from the rows AN, CN, and AN is subtracted from the sum signal of the effective pixels obtained by adding the signals output from the rows A1, C1, and A2. This cancels the fixed pattern noise component in the sum signal of the effective pixels. Similarly, the correction data generated by averaging the sum signals of the non-effective pixels obtained by adding the signals output from the rows CN, AN, and CN is subtracted from the sum signal of the effective pixels obtained by adding the signals output from the rows C2, A3, and C3. This cancels the fixed pattern noise component in the sum signal of the effective pixels.

As described above, according to this example, the sum signal of effective pixels is corrected based on the sum signal of non-effective pixels obtained by adding signals output from a plurality of non-effective pixels each of which includes one or more elements having the same functions and the same relative positional relationship as in a corresponding effective pixel. This enables to satisfactorily cancel fixed pattern noise unique to the combination of the added pixel signals.

(Application to Digital Camera)

Figure 16:
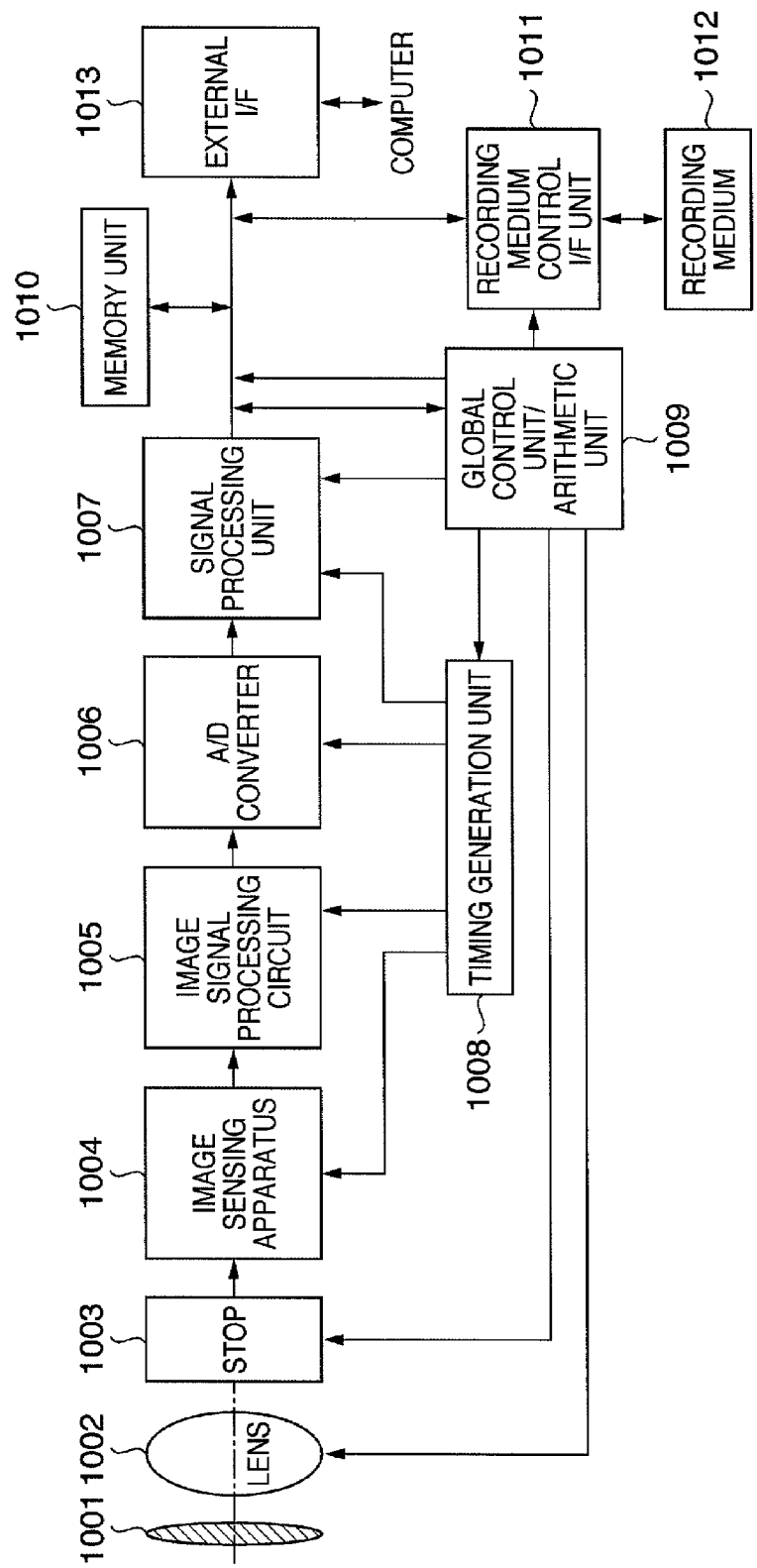
FIG. 16 is a block diagram showing an example of an image capturing system according to the present invention.
Figure 17:
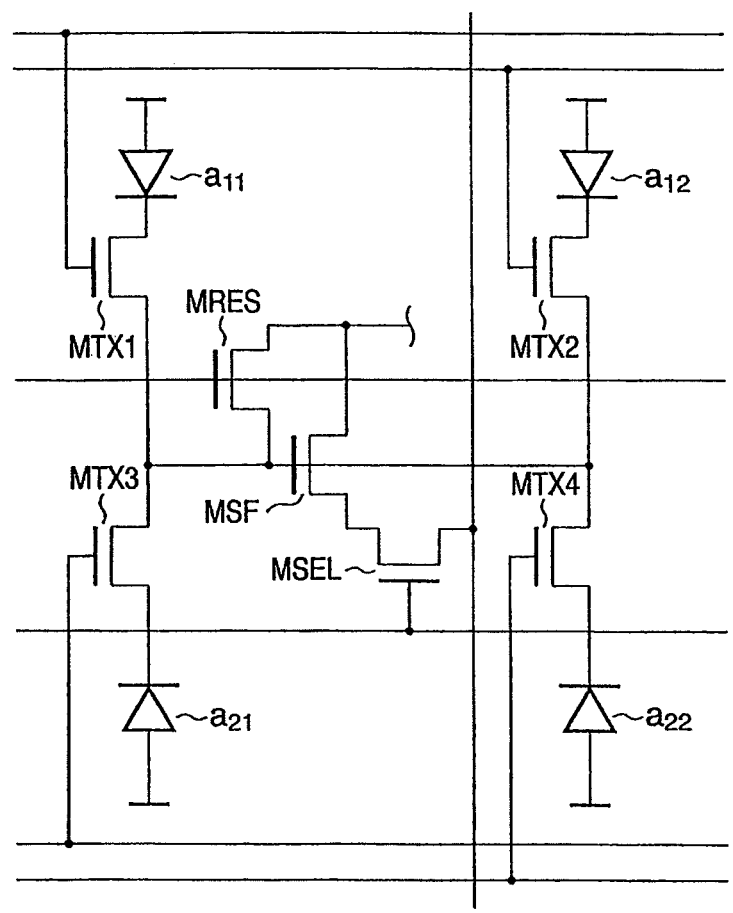
FIG. 17 is an equivalent circuit diagram for explaining a background art.

FIG. 16 shows circuit blocks of an image capturing system of the present invention which is applied to a camera. A shutter 1001 is located in front of a photographing lens 1002 to control exposure. A stop 1003 controls the amount of light as needed so that an image is formed on an image sensing apparatus 1004. The signal output from the image sensing apparatus 1004 is processed by image signal processing circuit 1005 and converted from an analog signal to a digital signal by an A/D converter (A/D conversion unit) 1006. The output digital signal further undergoes arithmetic processing by a signal processing unit 1007 (including a signal correction unit and a first signal processing unit). The processed digital signal is stored in a memory 1010 or sent to an external device via an external I/F 1013. A timing generation unit 1008 controls the image sensing apparatus 1004, signal processing circuit 1005, A/D converter 1006, and signal processing unit 1007. A global control unit/arithmetic unit 1009 controls the entire system. To record an image in a recording medium 1012, the output digital signal is recorded via a recording medium control I/F unit 1011 controlled by the global control unit/arithmetic unit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefits of Japanese Patent Application No. 2007-121835, filed May 2, 2007, and of Japanese Patent Application No. 2008-039094, filed Feb. 20, 2008 which are hereby incorporated by reference herein in their entirety.

What is claimed is:

1. An image capturing system comprising:
   an optical black region having a plurality of pixel blocks, wherein each of the plurality of pixel blocks has a plurality of pixels in a column for outputting a dark reference signal, each pixel block including at least one transistor which performs, for each pixel of the pixel block, the same function, and each pixel having a relative position, which is a position within the pixel block to which that pixel belongs, different from that of the remaining pixels of the pixel block to which that pixel belongs; and
   a signal correction unit which corrects a signal output from a defective pixel of a pixel block of the plurality of pixel blocks in accordance with only a signal output from a normal pixel of a pixel block of the plurality of pixel blocks, wherein the pixel block including the normal pixel is different from the pixel block including the defective pixel and in a same column as the pixel block including the defective pixel,
   wherein the normal pixel, whose signal is used by the signal correction unit for the correction, has a relative position within the pixel block to which the normal pixel belongs, that is the same as a relative position of the defective pixel within the pixel block to which the defective pixel belongs.

2. The image capturing system according to claim 1, wherein the at least one transistor includes an amplification transistor.

* * * * *